US010911406B2

(12) United States Patent
Tewari et al.

(10) Patent No.: US 10,911,406 B2
(45) Date of Patent: Feb. 2, 2021

(54) ACCESSING CLOUD RESOURCES USING PRIVATE NETWORK ADDRESSES

(71) Applicant: Microsoft Technology Licensing, LLC, Redmond, WA (US)

(72) Inventors: Rishabh Tewari, Redmond, WA (US); Deepak Bansal, Belevue, WA (US); Longzhang Fu, Bellevue, WA (US); Harish Kumar Chandrappa, Bothell, WA (US); Tomas Talius, Sammamish, WA (US); Dhruv Malik, Seattle, WA (US); Anitha Adusumilli, Sammamish, WA (US); Parag Sharma, Bellevue, WA (US); Nimish Aggarwal, Redmond, WA (US); Shekhar Agarwal, Bellevue, WA (US); Joemmanuel Ponce Galindo, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 15/967,518

(22) Filed: Apr. 30, 2018

(65) Prior Publication Data

US 2019/0334868 A1 Oct. 31, 2019

(51) Int. Cl.
*H04L 29/06* (2006.01)
*G06F 9/455* (2018.01)
(Continued)

(52) U.S. Cl.
CPC ...... *H04L 63/0236* (2013.01); *G06F 9/45558* (2013.01); *H04L 45/64* (2013.01);
(Continued)

(58) Field of Classification Search
CPC ............ G06F 9/45558; G06F 49/3009; G06F 2009/45587; G06F 61/6059;
(Continued)

(56) References Cited

U.S. PATENT DOCUMENTS 9,660,905 B2 * 5/2017 Dunbar ................. H04L 45/64
9,929,951 B1 * 3/2018 Dickinson ........... H04L 61/2514
(Continued)

FOREIGN PATENT DOCUMENTS

CN 107959654 A 4/2018

OTHER PUBLICATIONS

"International Search Report and Written Opinion Issued in PCT Patent Application No. PCT/US19/026416", dated Jun. 17, 2019, 11 Pages.

*Primary Examiner* — Ali S Abyaneh
*Assistant Examiner* — Shu Chun Gao
(74) *Attorney, Agent, or Firm* — Liang IP, PLLC

(57) ABSTRACT

Techniques for allowing access to shared cloud resource using private network addresses are disclosed herein. In one embodiment, a connection packet representing a connection request to a shared cloud resource in the cloud computing system can be intercepted. In response, the connection packet can be encapsulated with data representing one or more of a VNET ID, a VNET source address, or a VNET destination address of a virtual network from which the connection packet is received. The encapsulated connection packet can then be forwarded to the shared cloud resource while retaining the data representing one or more of the VNET ID, the VNET source address, or the VNET destination address for access control at the shared cloud resource.

20 Claims, 10 Drawing Sheets

(51) Int. Cl.
*H04L 12/715* (2013.01)
*H04L 12/935* (2013.01)
*H04L 29/12* (2006.01)
*H04L 29/08* (2006.01)

(52) U.S. Cl.
CPC ...... H04L 49/3009 (2013.01); H04L 61/2592 (2013.01); H04L 63/102 (2013.01); H04L 63/20 (2013.01); H04L 67/10 (2013.01); H04L 67/141 (2013.01); *G06F 2009/45595* (2013.01); *H04L 61/1511* (2013.01); *H04L 61/6059* (2013.01); *H04L 2212/00* (2013.01)

(58) Field of Classification Search
CPC ....... G06F 2009/45595; H04L 63/0236; H04L 67/10; H04L 63/20; H04L 63/101; H04L 63/102; H04L 45/64; H04L 61/2592; H04L 67/141; H04L 63/02; H04L 49/3009; H04L 45/586; H04L 69/22; H04L 61/1511; H04L 2212/00; H04L 41/0893; H04L 47/70; H04L 45/00; H04L 63/10; H04L 12/4633

See application file for complete search history.

(56) References Cited

U.S. PATENT DOCUMENTS

| | | | |
|---|---|---|---|
| 9,979,641 B2* | 5/2018 | Jain | H04L 45/74 |
| 2001/0014917 A1* | 8/2001 | Ishiyama | H04W 8/02 |
| | | | 709/227 |
| 2004/0170133 A1* | 9/2004 | Oguchi | H04L 69/329 |
| | | | 370/299 |
| 2014/0112139 A1* | 4/2014 | Allan | H04W 40/20 |
| | | | 370/235 |
| 2015/0163158 A1* | 6/2015 | Ryland | H04L 41/0893 |
| | | | 709/225 |
| 2017/0118173 A1 | 4/2017 | Arramreddy et al. | |
| 2018/0241727 A1* | 8/2018 | Verzun | H04L 9/0662 |

* cited by examiner

ACCESSING CLOUD RESOURCES USING PRIVATE NETWORK ADDRESSES

BACKGROUND

Cloud computing systems can provide various resources or services to users or "tenants" via a computer network, such as the Internet. Cloud computing systems typically include routers, switches, bridges, and other physical network devices that interconnect large numbers of servers, network storage devices, or other types of computing devices. The individual servers can host one or more virtual machines ("VMs"), virtual switches, or other types of virtualized functions. The virtual machines can facilitate execution of suitable applications to provide users access to cloud computing resources or services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In cloud-based datacenters or other large scale distributed computing systems, virtual networks (VNETs) can be used to segregate different tenant spaces. A virtual network is a computer network that includes, at least in part, virtual network links that do not include a physical wired or wireless connection between two computing devices, but instead is implemented using network virtualization. With virtual networks, a tenant can specify a custom network space using private IP addresses and specify own DNS servers for use by resources in the virtual network. As such, deployment of virtual networks can enable many types of computing resources, such as VMs, to securely communicate with one other, the internet, and on-premises networks.

However, it may be difficult to access certain types of resources via virtual networks in a cloud computing system. For example, a Structured Query Language (SQL) server or a cloud storage can facilitate data operations of many different tenants. To allow access to many different tenants, an SQL server or cloud storage is typically identified by public network addresses that can be accessed via a public network, such as the Internet. To access such resources from, for instance, a VM on a virtual network, a firewall protecting the virtual network needs to have an opening (e.g., a port) to the public network. Such openings can create security risks for unauthorized access via the Internet to data stored on the SQL server or cloud storage.

Several embodiments of the disclosed technology can address certain aspects of the foregoing challenge by implementing pseudo VNET injection to extend a virtual network to storage and other suitable types of shared resources in a cloud computing system. As such, a user of the virtual network can access corresponding SQL, cloud storage, or other shared resources using private domain names and/or VNET addresses instead of public network addresses. As such, by adding Internet DENY policies to a firewall of the virtual network or a subnet of the virtual network, a tenant can reduce or even avoid exposing any of the corresponding resources to the Internet, and thus enhancing data security.

In one implementation, a user can assign a private domain name and/or a VNET address to a corresponding shared resource at an account level. For example, a user can assign a private domain name "myaccount.private.storage.com" and a static VNET address of "192.168.0.1" to a cloud storage account of the user provided by a cloud storage service in the cloud computing system. The assigned private domain name and/or VNET address can then be stored as a resource record in a Domain Name System (DNS) server or service associated with the virtual network. In other examples, the user may only specify the private domain name, and the VNET address may be generated by a Dynamic Host Configuration Protocol (DHCP) controller or other suitable entities.

During operation, an application executed in a VM on the virtual network can request access to data from the private domain at "myaccount.private.storage.com." In response, the DNS server of the virtual network can resolve the private domain name to the VNET address of "192.168.0.1." The application and/or the VM can then initiate a connection request according to, for instance, Transmission Control Protocol (TCP) to the VNET address at "192.168.0.1," by generating and transmitting one or more connection packets for setup of a TCP connection.

In accordance with embodiments of the disclosed technology, a tunneling component operatively coupled to the VM can then intercept the connection packets, retrieve a routable network address of the cloud storage, from, for instance, a Software Defined Network (SDN) controller, and modify one or more header fields of the connection packets using the routable network address. The routable network address can be, for example, a network address of the cloud storage in an underlay network in the cloud computing system or in a public network. Modifying the connection packets with the routable network address can include appending an outer header containing the routable network address as a destination network address, replacing a value in a destination address field of a current header, or modifying the connection packets in other suitable manners.

In certain implementations, the tunneling component can be a software component that is a part of a hypervisor facilitating operations of the VM and other VMs on a host. In other embodiments, the tunneling component can be a standalone software component, for instance, as a driver in an operating system executing on the host. In further embodiments, the tunneling component can include a hardware component (e.g., a field programmable gate array, FPGA) residing in the host and can be programmed by the hypervisor/operating system for executing suitable operations as described below.

The tunneling component can also be configured to encapsulate the one or more connection packets with additional data representing one or more of a VNET ID of the virtual network, a VNET source (e.g., a VM), a VNET destination (e.g., a cloud storage account), optionally a VNET subnet ID, and/or other suitable VNET information. In one implementation, the foregoing data can be encoded using an Internet Protocol version 6 (IPv6) address format. For instance, an example IPv6 address can include 10 bits for storing a Unique Local Address (ULA) prefix, 5 bits of reserved data, 1 bit for an data exfiltration indicator, 32 bits storing VNET address of the cloud storage account (e.g., "192.168.0.1"), 32 bits for storing VNET ID, 16 bits for storing a subnet ID, and 32 bits for storing a VNET source address (e.g., of the VM). In other examples, some or all of the foregoing data of the virtual network can be encoded in other suitable formats. Upon completion of encapsulation, the tunnel component can forward the encapsulated connection packets to the cloud storage at the routable network address via, for instance, the underlay network.

Upon receiving the connection packets, a storage controller at the cloud storage can analyze the virtual network information encapsulated in the received connection packets and determine whether to grant access to the cloud storage account. For example, in one embodiment, the storage controller can first decapsulate the connection packets to extract the VNET ID, the VNET source, the VNET destination, or optionally the VNET subnet ID. The storage controller can then determine whether the connection packets are from a virtual network or a source with access rights to the cloud storage based on the VNET ID and the VNET source. In response to determining that the virtual network or the source has no access rights, the storage controller can deny the access request. Otherwise, the storage controller can also determine whether the connection request is directed to the particular cloud storage account based on the value in the VNET destination. In response to determining that the connection request is directed to the particular cloud storage account, the storage controller can grant access to the cloud storage account. Otherwise, the storage controller can deny the connection request.

Several embodiments of the disclosed technology can improve data security in cloud storage, SQL, or other suitable types of shared resources in a cloud computing system. For example, by allowing access to cloud storage accounts using private domain names and/or VNET addresses, a user of a virtual network can impose firewall policies to deny all access to the virtual network from a public network such as the Internet. As a result, the cloud storage or SQL resources are not exposed or "visible" to a public network, such as the Internet. Thus, even if the user's credential for accessing the cloud storage is compromised, an unauthorized party still cannot access the cloud storage account from the Internet because only connection requests from within the virtual network are allowed. In addition, the user can also impose firewall policies to deny all access to the public network from within the virtual network. As such, while the user can still access the cloud storage using the VNET addresses, VMs and/or applications executed inside the virtual network may not access the Internet from within the virtual network. Thus, risks of unauthorized or accidental data exfiltration to the public network may be reduced or even eliminated.

DETAILED DESCRIPTION

Certain embodiments of systems, devices, components, modules, routines, data structures, and processes for accessing a shared cloud resource using VNET addresses in datacenters or other suitable cloud computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term "cloud computing system" generally refers to an interconnected computer system having multiple network nodes that interconnect a plurality of servers or hosts to one another and/or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines, virtual switches, or other suitable virtualized components. For example, a host can include a server having a hypervisor configured to support one or more virtual machines, virtual switches or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Figures 5, 6A, 6B:
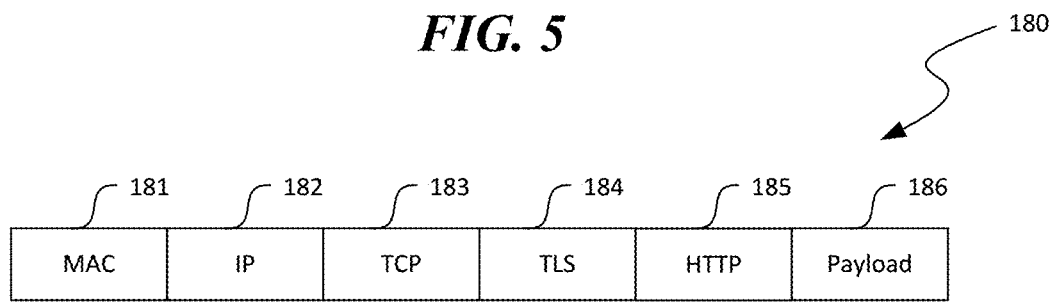
FIG. 5 is a schematic diagram illustrating example conditions and corresponding actions for a rule object suitable for a tunnel component in accordance with embodiments of the disclosed technology.
FIGS. 6A and 6B illustrate an example data schema for a packet header suitable to be processed by a tunnel component in accordance with embodiments of the disclosed technology.

Further used herein, a Match Action Table (MAT) generally refers to a data structure having multiple entries in a table format. Each of the entries can include one or more conditions and one or more corresponding actions. The one or more conditions can be configured by a network controller (e.g., an Software Defined Network or "SDN" controller) for matching a set of header fields of a packet. The action can also be programmed by the network controller to apply an operation to the packet when the conditions match the set of header fields of the packet. The applied operation can modify at least a portion of the packet in order to forward the packet to an intended destination. Example conditions and actions are shown in FIG. 5.

As used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information. An example data schema for control data is described in more detail below with reference to FIGS. 6A-6B.

Also used herein, a "shared cloud resource" generally refers to computing, storage, or other suitable types of resource that is shared by multiple tenants in a cloud computing system. For example, a cloud storage can be shared by multiple tenants each with a corresponding cloud storage account. Other examples of a shared cloud resource can include SQL database services, cloud computing functions, etc. Such shared cloud resources may be difficult to segregate using VNETs because access to the shared cloud resources are provided to multiple tenants. Several embodiments of the disclosed technology are directed to extending VNETs to such shared cloud resources via pseudo VNET injection such that a tenant can access a corresponding account of the shared cloud resources using private domain names and/or VNET addresses, as described in more detail below with reference to FIGS. 1-8.

Figure 1:
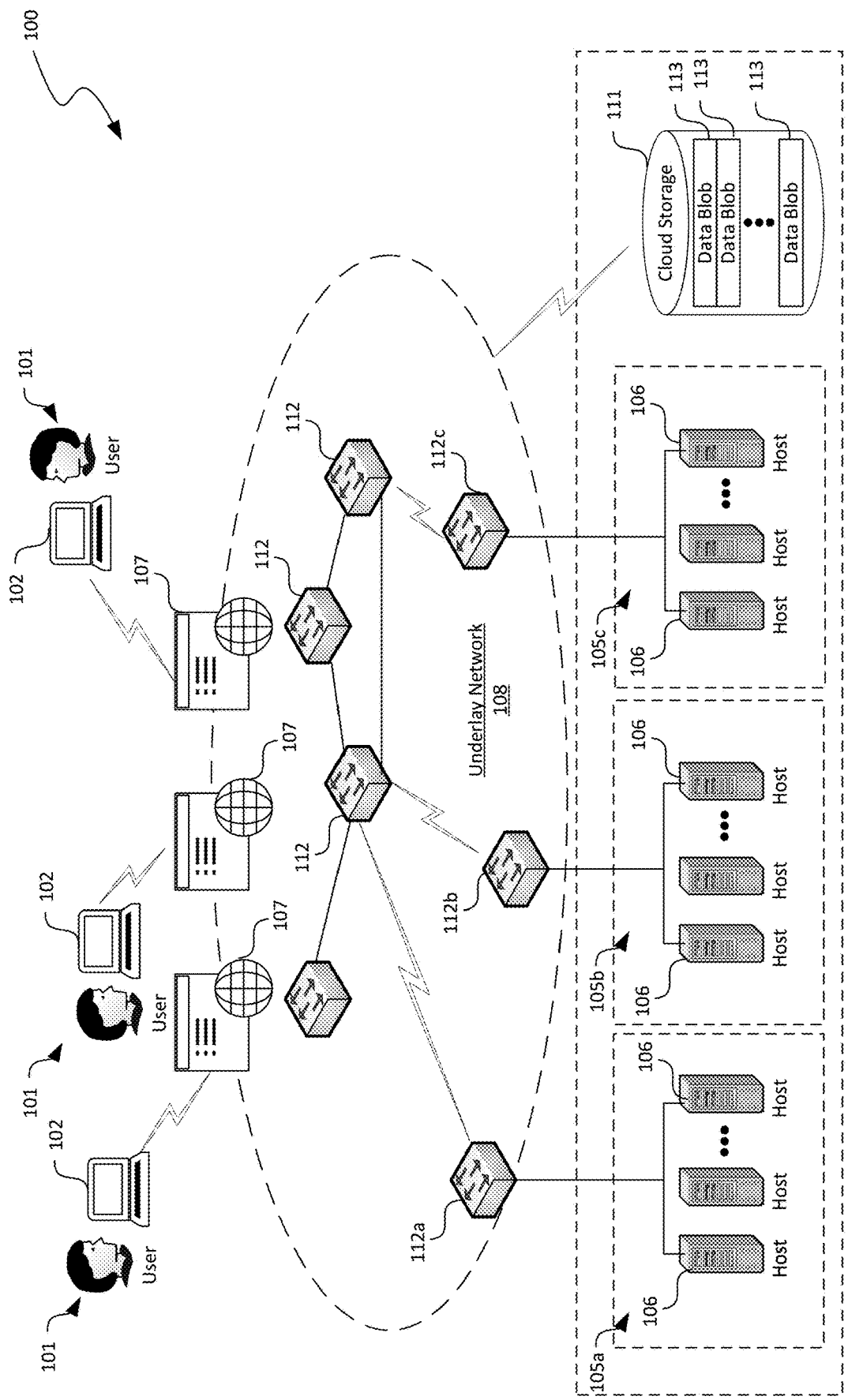
FIG. 1 is a schematic diagram illustrating a cloud computing system implementing accessing shared cloud resources using VNET addresses in accordance with embodiments of the disclosed technology.

FIG. 1 is a schematic diagram illustrating a cloud computing system 100 implementing accessing shared cloud resources using VNET addresses in accordance with embodiments of the disclosed technology. As shown in FIG. 1, the cloud computing system 100 can include an underlay network 108 interconnecting a plurality of hosts 106, a plurality of client devices 102 associated with corresponding users 101, and a cloud storage 111 operatively coupled to one another. Even though particular components of the cloud computing system 100 are shown in FIG. 1, in other embodiments, the cloud computing system 100 can also include additional and/or different components or arrangements. For example, in certain embodiments, the cloud computing system 100 can also include SQL databases, additional hosts, and/or other suitable components (not shown) in other suitable configurations.

As shown in FIG. 1, the underlay network 108 can include one or more network nodes 112 that interconnect the multiple hosts 106 and the client device 102 of the users 101. In certain embodiments, the hosts 106 can be organized into racks, action zones, groups, sets, or other suitable divisions. For example, in the illustrated embodiment, the hosts 106 are grouped into three host sets identified individually as first, second, and third host sets 105a-105c. Each of the host sets 105a-105c is operatively coupled to a corresponding network nodes 112a-112c, respectively, which are commonly referred to as "top-of-rack" network nodes or "TORs." The TORs 112a-112c can then be operatively coupled to additional network nodes 112 to form a computer network in a hierarchical, flat, mesh, or other suitable types of topology. The underlay network 108 can allow communications among hosts 106, the cloud storage 111, and the users 101. In other embodiments, the multiple host sets 105a-105c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the provided virtual machines 144 to perform computation, communications, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates the users 101 to access cloud services provided by the hosts 106 via the underlay network 108. In the illustrated embodiment, the client devices 102 individually include a desktop computer. In other embodiments, the client devices 102 can also include laptop computers, tablet computers, smartphones, or other suitable computing devices. Though three users 101 are shown in FIG. 1 for illustration purposes, in other embodiments, the cloud computing system 100 can facilitate any suitable numbers of users 101 to access cloud or other suitable types of computing services provided by the hosts 106 in the cloud computing system 100.

The cloud storage 111 can be configured to contain copies of files organized as binary large objects or data blobs 113 suitable for storing digital data of documents, images, videos, or other suitable content. Each of the data blobs 113 can be accessible by a corresponding user 101 via, for instance, a corresponding portal 107. As discussed in more detail below, the cloud computing system 100 can be implemented with pseudo VNET injection such that the users 101 can access corresponding data blobs 113 using private domain names and/or virtual network addresses. As such, firewall policies can be imposed in the virtual networks to deny all access to public network addresses (e.g., Internet addresses) from within the virtual networks while the users 101 can still access the data blobs 113 at the cloud storage 111 using the VNET addresses.

Figure 2:
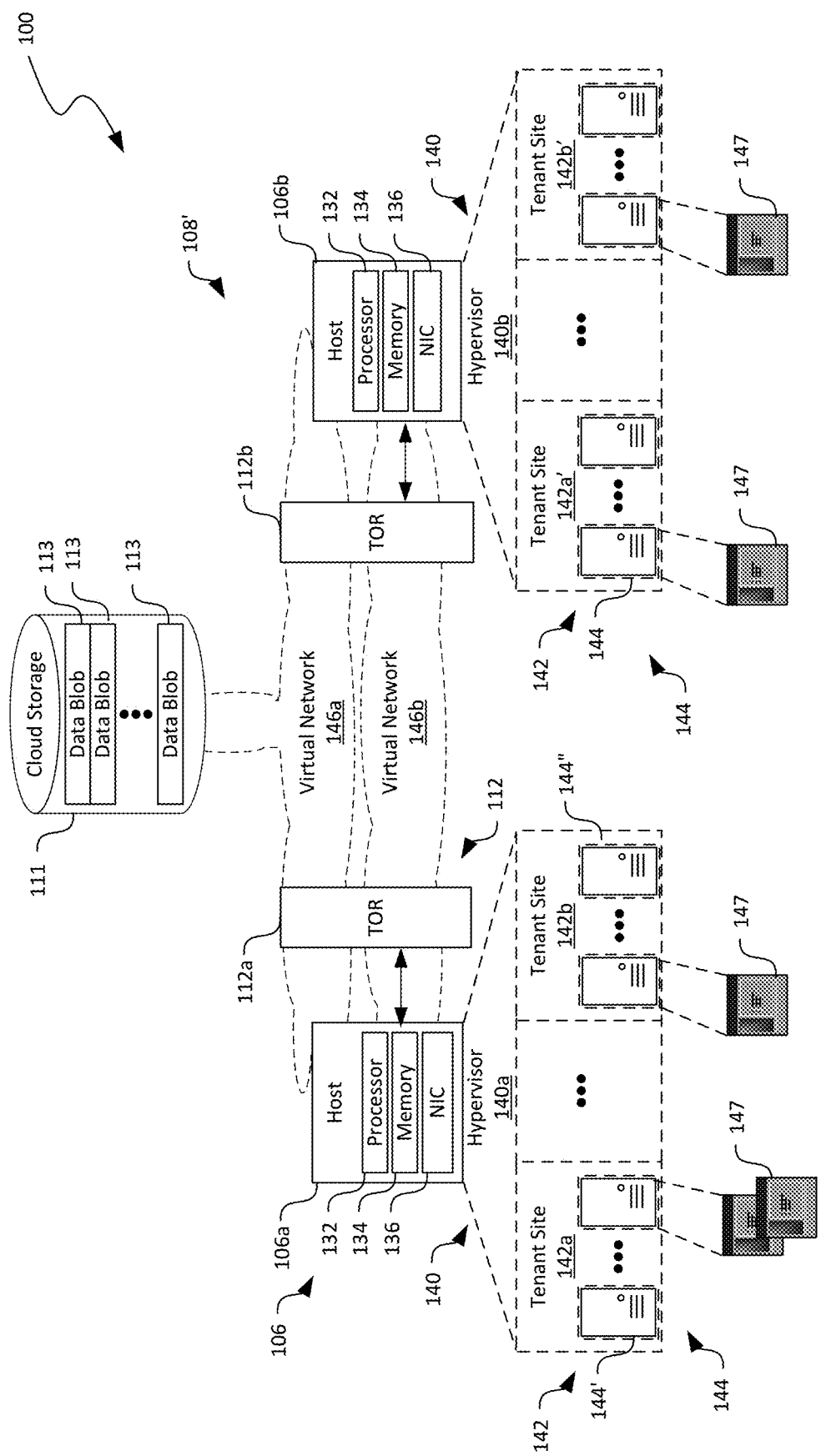
FIG. 2 is a schematic diagram illustrating certain hardware/software components of the cloud computing system of FIG. 1 in accordance with embodiments of the disclosed technology.

FIG. 2 is a schematic diagram illustrating certain hardware/software components of the cloud computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity.

In FIG. 2 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and a network interface card (NIC) 136 operatively coupled to one another. In other embodiments, the hosts 106 can also include input/output devices configured to accept input from and provide output to an operator and/or an automated software controller (not shown), or other suitable types of hardware components.

The processor 132 can include a microprocessor, caches, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A-7D). Though only one processor 132 and one memory 134 are shown in the individual hosts 106 for illustration in FIG. 2, in other embodiments, the individual hosts 106 can include two, six, eight, or any other suitable number of processors 132 and/or memories 134.

The first and second hosts 106a and 106b can individually contain instructions in the memory 134 executable by the processors 132 to cause the individual processors 132 to provide a hypervisor 140 (identified individually as first and second hypervisors 140a and 140b). The hypervisors 140 can individually be configured to generate, monitor, terminate, and/or otherwise manage and/or facilitate operations of one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively.

The hypervisors 140 are shown in FIG. 2 as a software component. However, in other embodiments, the hypervisors 140 can be firmware and/or hardware components. The tenant sites 142 can each include multiple virtual machines 144 for a particular tenant or user 101 (FIG. 1). For example, the first host 106a and the second host 106b can both host the tenant site 142a and 142a' for a first user 101 (FIG. 1). The first host 106a and the second host 106b can both host the tenant site 142b and 142b' for a second user 101 (FIG. 1). Each virtual machine 144 can be executing a corresponding operating system, middleware, and/or one or more applications 147.

Also shown in FIG. 2, the cloud computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

As shown in FIG. 2, to facilitate communications with one another or with external devices, the individual hosts 106 can also include a network interface card ("NIC") 136 for interfacing with a computer network (e.g., the underlay network 108 of FIG. 1). A NIC 136 can include a network adapter, a LAN adapter, a physical network interface, or other suitable hardware circuitry and/or firmware to enable communications between hosts 106 by transmitting/receiving data (e.g., as packets) via a network medium (e.g., fiber optic) according to Ethernet, Fibre Channel, Wi-Fi, or other suitable physical and/or data link layer standards. During operation, the NIC 136 can facilitate communications to/from suitable software components executing on the hosts 106. Example software components can include the virtual switches (not shown), the virtual machines 144, applications 147 executing on the virtual machines 144, the hypervisors 140, or other suitable types of components.

As shown in FIG. 2, the virtual networks 146 can be extended to the cloud storage 111 to allow a user 101 to access a cloud storage account using private domain names and/or VNET addresses. Typically, access to the cloud storage 111 or other suitable types of resources in the cloud computing system 100 are based on public network addresses accessible via a public network, such as the Internet. To access such resources from, for instance, a virtual machine 144 on a virtual network 146, a firewall protecting the virtual network 146 needs to have an opening (e.g., a port) for accessing via the public network. Such openings can create security risks for any data stored on the cloud storage 111 that is accessible via the Internet.

Several embodiments of the disclosed technology can address certain aspects of the foregoing challenges by implementing pseudo VNET injection. As such, a user 101 of the virtual network 146 can access corresponding cloud storage 111 or other shared resources in the cloud computing system 100 using VNET addresses and private domain names instead of public network addresses. As such, by adding an Internet DENY policy to the virtual networks 146 or a subnet thereof, a user 101 can reduce or even avoid exposing any of the corresponding resources to the Internet, as described in more detail below with reference to FIGS. 3A-4D.

Figure 3A:
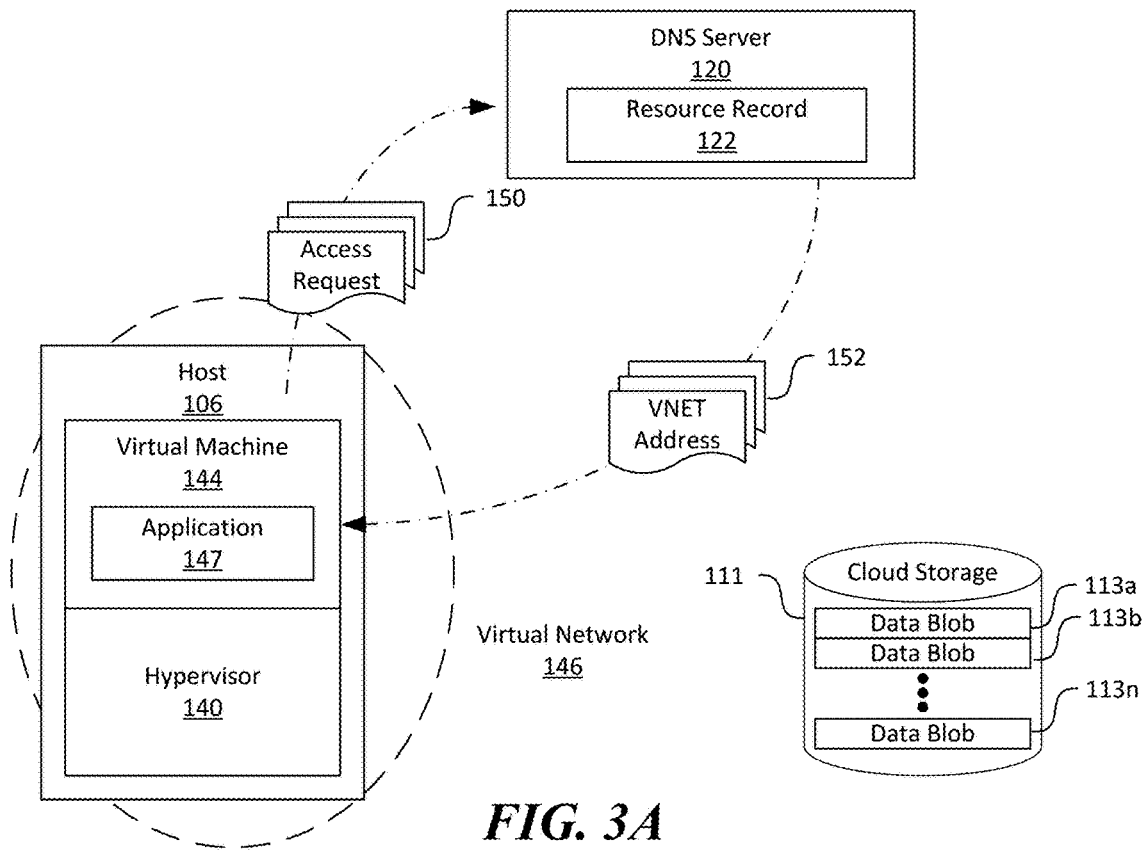
FIGS. 3A-3D are schematic diagrams illustrating accessing a cloud resource using VNET addresses from within a virtual network during certain operations in accordance with embodiments of the disclosed technology.

FIGS. 3A-3D are schematic diagrams illustrating accessing a cloud resource using VNET addresses from a virtual machine 144 in a virtual network 146 during certain operations in accordance with embodiments of the disclosed technology. As shown in FIG. 3A, in certain implementations, a user 101 or an administrator (not shown) of a tenant site 142 can assign a private domain name and a VNET address to a data blob 113 of the user 101. For example, a user 101 can assign a private domain name "myaccount.private.storage.com" and a VNET address of "192.168.0.1" to a data blob 113a according to a cloud storage account at the cloud storage 111. The assigned private domain name and/or VNET address can then be stored as a resource record 122 in a DNS server 120 or service associated with the virtual network 146.

Figure 3B:
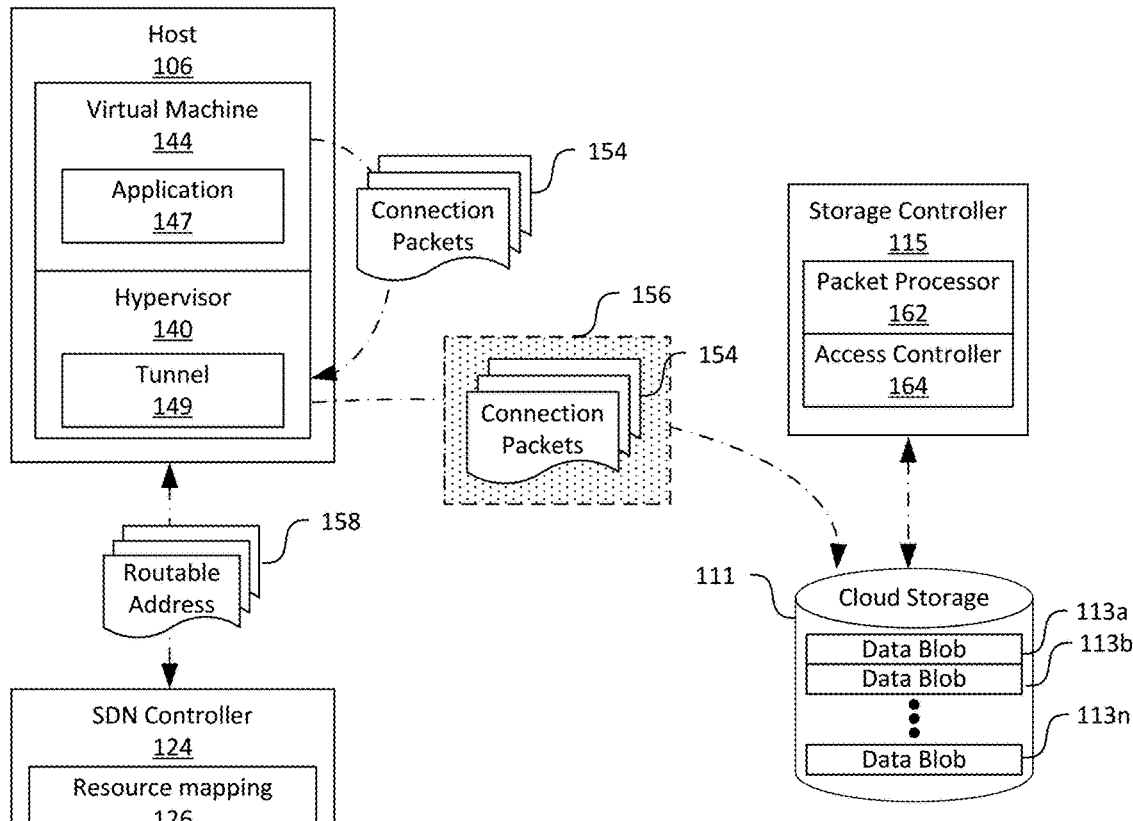

During operation, an application 147 executed in a virtual machine 144 of the virtual network 146 can initiate an access request 150 to data from data blob 113a using the private domain name "myaccount.private.storage.com." In response, the DNS server 120 can resolve the private domain name to the VNET address 152 of "192.168.0.1." The application 147 and/or the virtual machine 144 can then initiate a connection request according to, for instance, Transmission Control Protocol (TCP) to the VNET address at "192.168.0.1," by generating and transmitting one or more connection packets 154 corresponding to setup and clear-down of a TCP connection, as shown in FIG. 3B.

As shown in FIG. 3B, the hypervisor 140 can include a tunnel component 149 configured to intercept the connection packets 154 according to, for instance, a MAT (not shown) stored at the hypervisor 140 and/or the host 106. In one implementation, the MAT can contain an entry that indicates that a packet having a destination VNET address of "192.168.0.1" is intercepted and processed according to corresponding actions. For example, as shown in FIG. 3B, one action can include the tunnel component 149 accessing a resource mapping 126 at an SDN controller 124 to determine a routable network address 158 (e.g., a public network address in the underlay network 108 in FIG. 1) of the cloud storage 111. Another action can include modifying a destination address header field of the connection packets 154 with the retrieved routable network address 158 to generate modified connection packets 156, by, for instance, replacing a destination address header field with the routable network address 158, adding an outer destination address header field, or perform other suitable modifications.

The tunneling component 149 can also be configured to encapsulate the one or more connection packets 156 with additional data representing one or more of a VNET ID of the virtual network 146, a VNET source (e.g., the virtual machine 144), a VNET destination (e.g., the data blob 133a), or optionally a VNET subnet ID. In one implementation, the foregoing data can be encoded using an Internet Protocol version 6 (IPv6) address format. For instance, an example IPv6 address can include 10 bits for storing a Unique Local Address (ULA) prefix, 5 bits of reserved data, 1 bit for an data exfill indicator, 32 bits storing VNET address of the cloud storage account (e.g., "192.168.0.1"), 32 bits for storing VNET ID, 16 bits for storing a subnet ID, and 32 bits for storing a VNET source address (e.g., of the VM). In other examples, some or all of the foregoing data of the virtual network 146 can be encoded in other suitable formats. The encapsulated data can then be used by the cloud storage 111 for access control, as described in more detail below with reference to FIGS. 3C and 3D.

Upon completion of the foregoing encapsulation, the tunnel component 149 can forward the encapsulated connection packets 156 to the cloud storage 111 at the routable network address via, for instance, the underlay network 108 of FIG. 1. As shown in FIG. 3B, the cloud storage 111 can be operatively coupled to a storage controller 115 configured to monitor and manage operations of the data blobs 113. In the illustrated example, the storage controller 115 is shown as a separate component from the cloud storage 111. In other examples, the storage controller 115 and the cloud storage 111 can be integrated into one component.

As shown in FIG. 3B, the storage controller 115 can include a packet processor 162 and an access controller 164 operatively coupled to one another. The packet processor 162 can be configured to receive and inspect the received connection packets 156. For example, in one embodiment, upon receiving the connection packets 156, the packet processor 162 at the storage controller 115 can decapsulate an outer header of the connection packets 156 and inspect values contained in the encoded IPv6 address to extract the VNET ID, the VNET source, the VNET destination, or optionally the VNET subnet ID. The packet processor 162 can then pass the extracted values of the foregoing parameters to the access controller 164 for determine whether access to the cloud storage 111 is to be granted.

Figure 3C:
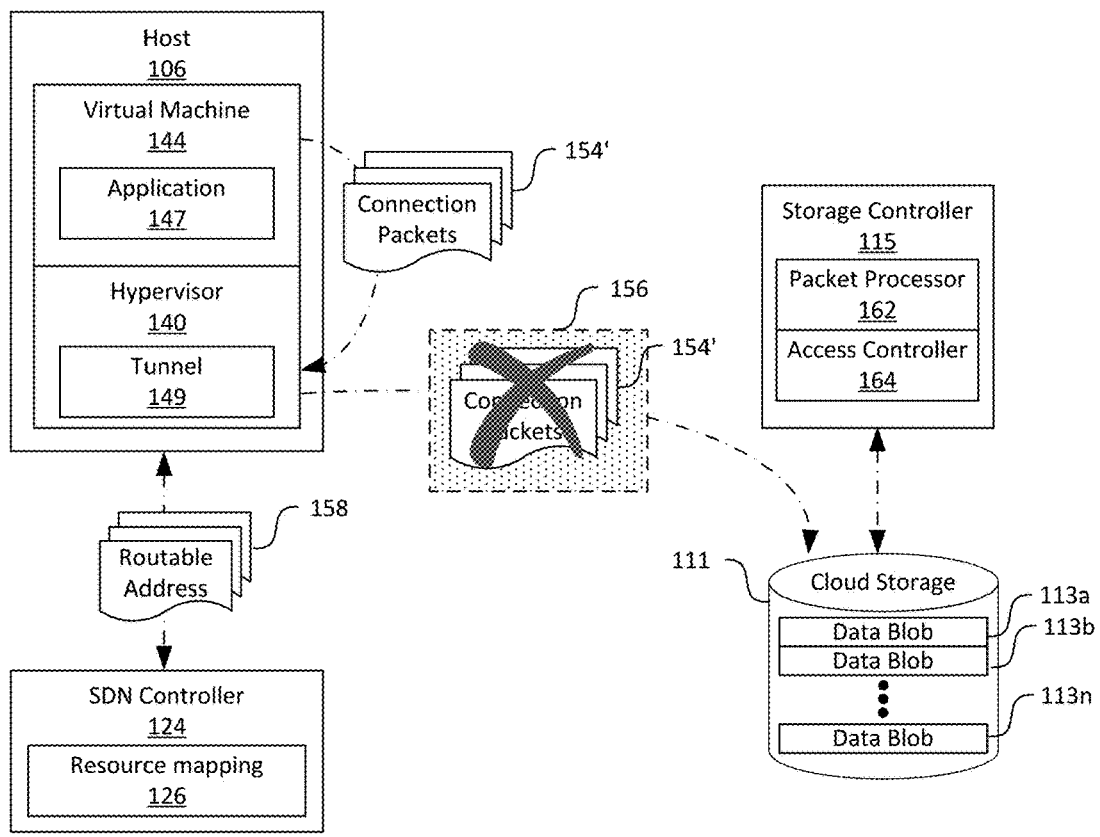
Figure 3D:
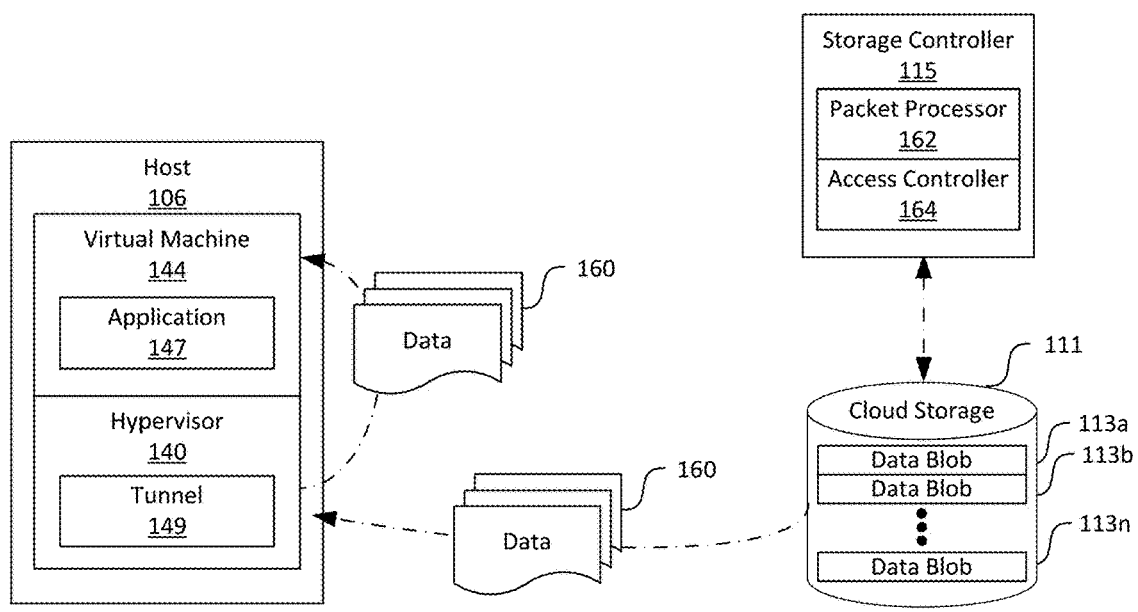

The access controller 164 can be configured to apply rules of access control list (ACL). In one embodiment, the access controller 164 can be configured to determine whether the decapsulated connection packets 154 are from a virtual network or a source in the virtual network with access rights to the cloud storage 111 based on the VNET ID and the VNET source. For example, in the example above, the access controller 164 can determine that the original connection packets 154 are generated by the virtual machine 144 of the virtual network 146 based on the VNET ID and the VNET source. In response to determining that the virtual network 146 or the virtual machine 144 has no access rights, the storage controller can deny the access request, as shown in FIG. 3C. Otherwise, the access controller 164 can also be configured to determine whether the connection request is directed to the particular cloud storage account (e.g., data blob 133a) based on the value of the VNET destination. In response to determining that the connection request is indeed directed to the particular cloud storage account, the access controller 164 can grant access to the cloud storage account, e.g., data blob 133a, and provide data 160 to the virtual machine 144 via the hypervisor 140, as shown in FIG. 3D. Otherwise, the access controller 164 can deny the connection request, as shown in FIG. 3C.

Several embodiments of the disclosed technology can thus improve data security in the cloud storage 111, or other suitable types of resources provided by the cloud computing system 100 by only allow access to the cloud storage 111 using VNET addresses and/or private domain names. For example, in the cloud computing system 100, a user 101 of a virtual network 146 can impose firewall policies to deny all public network access to the virtual network 146. As a result, the user's account at the cloud storage 111 is not exposed at all to the Internet to reduce or even eliminate exposure to unauthorized data access from the public network. Thus, even if the user's 101 credential for accessing the cloud storage 111 is compromised, an unauthorized party still cannot access the cloud storage 111 because the storage controller 115 only allows connection from within the virtual network 146. In addition, the user 101 can also impose firewall policies to deny all access to public network addresses from within the virtual network 146. As such, virtual machines 144 or applications 147 executed inside the virtual network 146 may not access the Internet from within the virtual network 146. Thus, risks of unauthorized or accidental data exfiltration to the public network may be reduced or even eliminated.

Figure 4A:
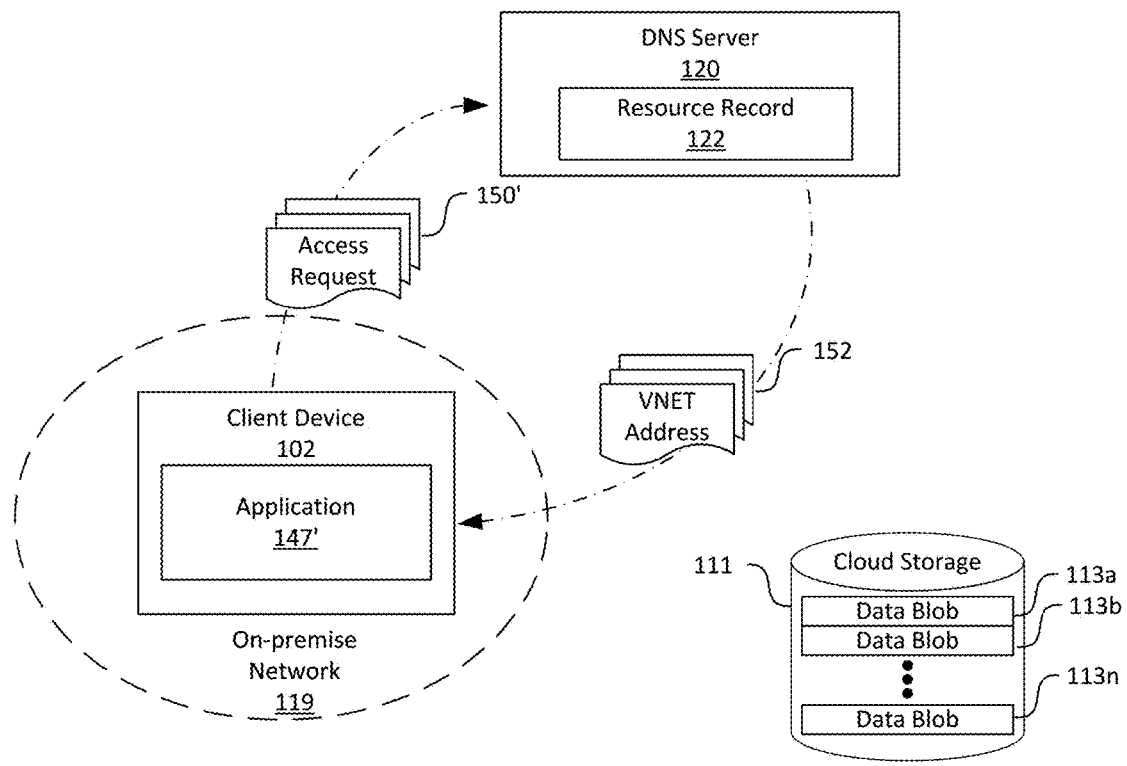
FIGS. 4A-4D are schematic diagrams illustrating accessing a cloud resource using VNET addresses from an on-premise network during certain operations in accordance with embodiments of the disclosed technology.

FIG. 3A-3D illustrate certain example operations of accessing the cloud storage 111 using private domain names and/or VNET addresses from within the virtual network 146. In other embodiments, the cloud computing system 100 can also be implemented with a communications gateway 170 (shown in FIG. 4B) configured to enable similar operations from client devices 102 at an on-premise network 119 of a company, cooperation, or other suitable entity. For example, as shown in FIG. 4A, the on-premise network 119 can include a local area network (not shown) having a client device 102 executing an application 147'. Similar to the operations described above with reference to FIGS. 3A-3B, the user 101 (FIG. 1) or an administrator (not shown) of the on-premise network 119 can also assign a private domain name and a VNET address to the data blob 133a. The assigned VNET address can be in a network address space of the on-premise network 119.

During operation, the application 147' can initiate an access request 150' to data from the data blob 113a using the private domain name. In response, the DNS server 120 (at the client device 102 or at the virtual network 146) can resolve the private domain name to the VNET address 152. The application 147' and/or the client device 102 can then initiate a connection request by generating and transmitting one or more connection packets 154' corresponding to setup and clear-down of a TCP connection, as shown in FIG. 4B.

Figure 4B:
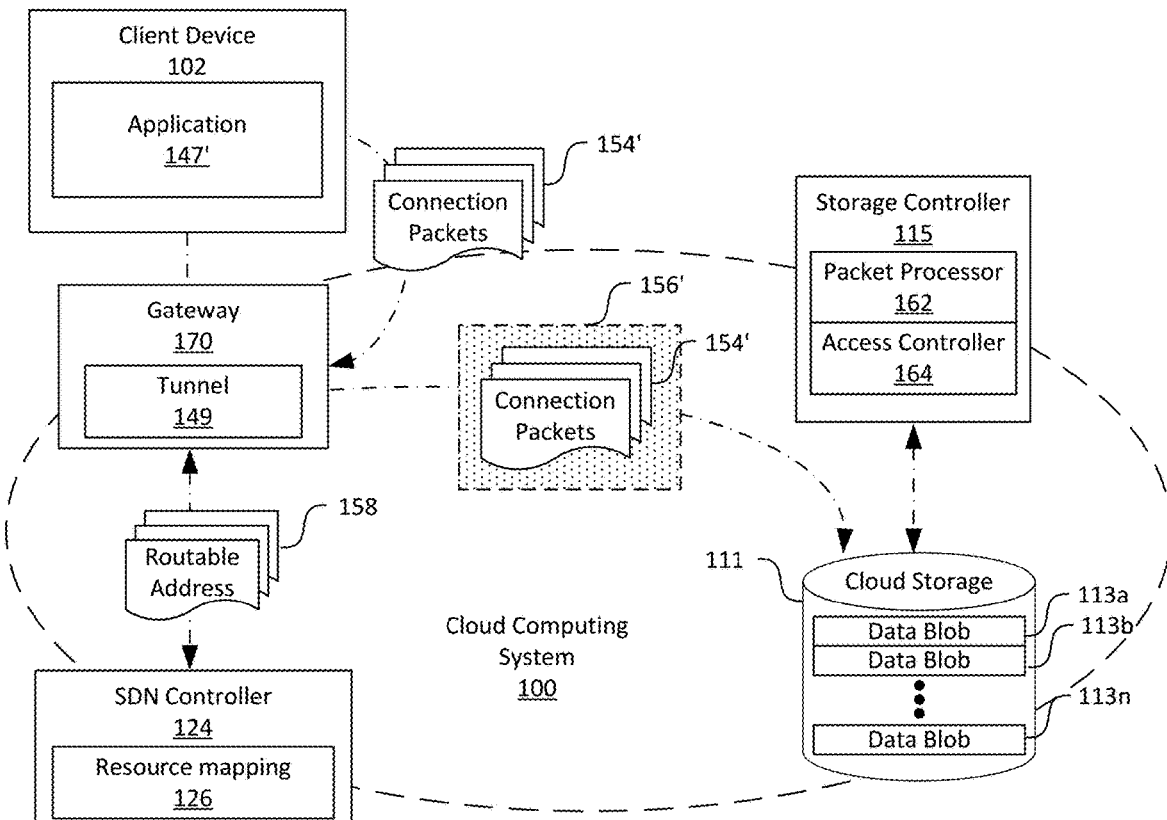

As shown in FIG. 4B, the client device 102 can be communicatively coupled to a gateway 170 at the cloud computing system 100. In one embodiment, the gateway 170 can include an Express Gateway connected to the on-premise network 119 (FIG. 4A) via a dedicated network connection. In other embodiments, the gateway 170 can include a virtual private network (VPN) gateway connected to the on-premise network 119 via a public network such as the Internet.

As shown in FIG. 4B, the gateway 120 can also include a tunnel component 149 similar to that described above with reference to FIGS. 3B-3D. For example, the tunnel component 149 can be configured to retrieve a routable network address 158 of the cloud storage 111 and modify the received connection packets 154' to modified connection packets 156'. The tunnel component 149 can also be configured to encapsulate the one or more connection packets 156' with additional data representing one or more of a private network ID of the on-premise network 119, a private source address (e.g., the client device 102), a private destination address (e.g., the data blob 133a), or optionally a private subnet ID, as described above with reference to FIG. 3B. Upon completion of the foregoing encapsulation, the tunnel component 149 can transmit the encapsulated connection packets 156' to the cloud storage 111 at the routable network address via, for instance, the underlay network 108 of FIG. 1.

Figure 4C:
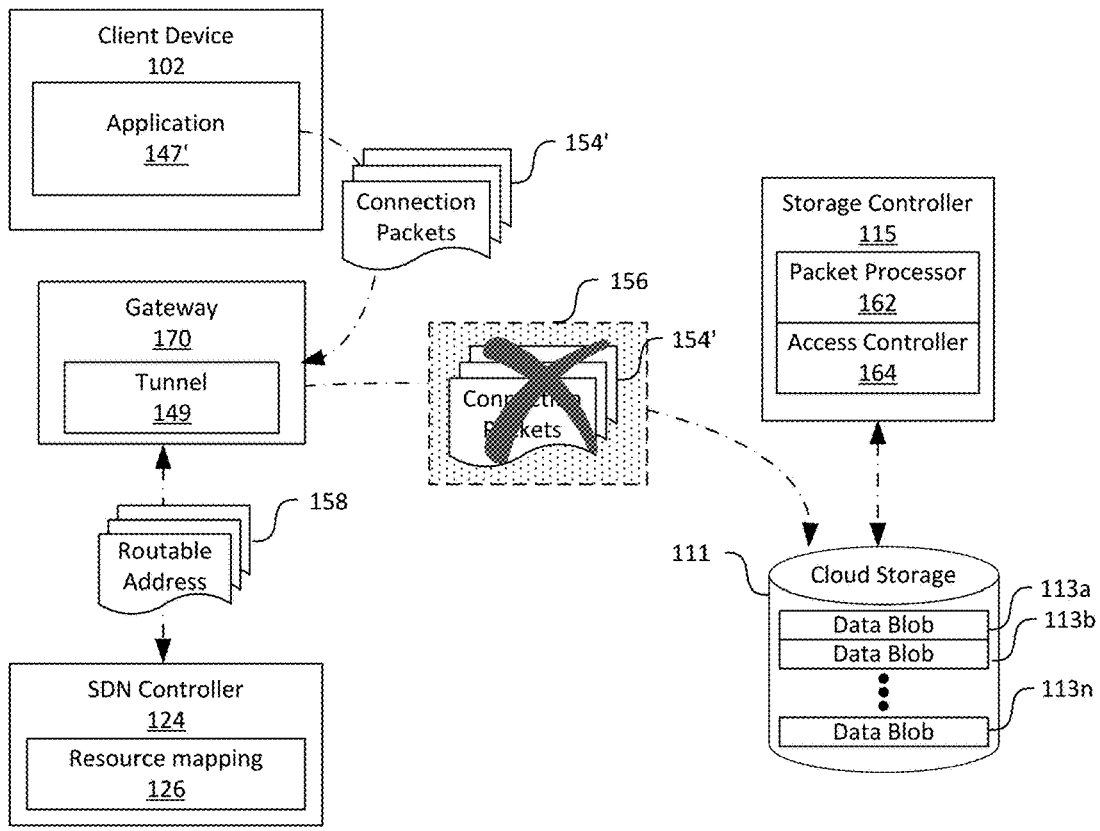
Figure 4D:
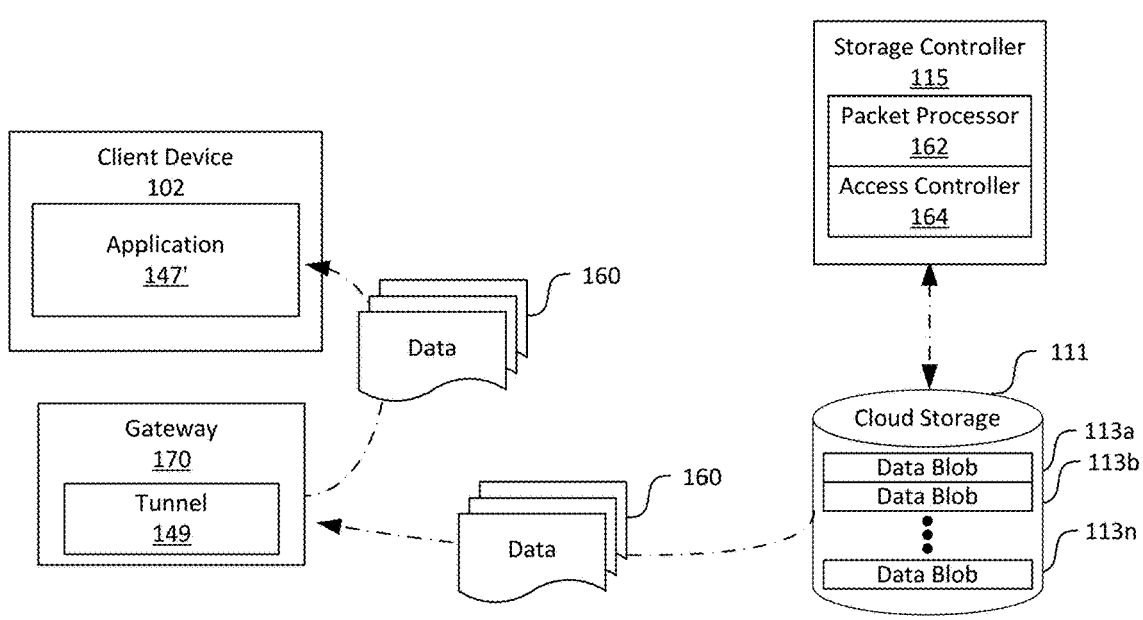

Upon receiving the connection packets 156', the storage controller 115 can then inspect the received connection packets 156' and determine whether to grant access to the data blob 113a according to ACL, as described in more detail above with reference to FIG. 3C. As shown in FIG. 4C, in response to determining that the client device 102 has no access rights to the data blob 113a, the storage controller 115 can deny the access request. Otherwise, the storage controller 115 can grant access to the data blob 113a, as shown in FIG. 4D.

FIG. 5 is a schematic diagram illustrating example conditions and corresponding actions for an entry 171 in a flow table or MAT in accordance with embodiments of the disclosed technology. In certain embodiments, as shown in FIG. 5, the entry 171 can include actions 176 upon matching packets in a MAT model with conditions 172. When creating an entry, a network controller (e.g., an SDN controller, not shown) can be expressive while reducing fixed policy in a data plane.

As shown in FIG. 5, the entry 171 can include a condition list containing multiple conditions 172, and one or more corresponding actions 176. Example conditions 172 can include source/destination MAC, source/destination IP, source/destination TCP port, source/destination User Datagram Protocol ("UDP") port, general routing encapsulation key, Virtual Extensible LAN identifier, virtual LAN ID, or other metadata regarding the payload of the packet. Conditions 172 can have a type (such as source IP address) and a list of matching values (each value may be a singleton, range, or prefix). For a condition to match a packet, any of the matching values can match as in an OR clause. For an entry 171 to match, all conditions 172 in the entry 171 match as in an AND clause.

The action 176 can also contain a type and a data structure specific to that type with data needed to perform the action. For example, an encapsulation action can take as input data a source/destination IP address, source/destination MAC address, encapsulation format and key to use in encapsulating the packet. As shown in FIG. 5, the example actions can include allow/circuit a packet according to, for example, ACLs, network name translation (L3/L4), encapsulation/ decapsulation, quality of service operations (e.g., rate limit, mark differentiated services code point, metering, etc.), encryption/decryption, stateful tunneling, and routing (e.g., equal cost multiple path routing).

FIG. 6A is a schematic diagram illustrating a data schema 180 suitable for a packet header in accordance with embodiments of the disclosed technology. As shown in FIG. 6A, the data schema 180 can include a MAC field 181, an IP field 182, a TCP field 183, a TLS field 184, an HTTP field 185, and a data field 186. The MAC field 181, the IP field 182, and the TCP field 183 can be configured to contain a MAC address, an IP address, and a port number of the NIC 136 (FIG. 2) and/or the host 106 (FIG. 2), respectively. The TLS field 184 can be configured to contain a value indicating a type of data contained in the packet. Example values for the TLS field 184 can include APPLICATION_DATA, CHANGE_CIPHER_SPEC, ALERT, or HANDSHAKE. The HTTP field 185 can be configured to contain various parameters according to the HTTP protocol. For example, the parameters can include a content length of the data in the data field 186, cache control, etc. Example header fields of the HTTP field 185 are described in more detail with reference to FIG. 6B. Even though the example data schema 180 includes the HTTP field 185, in other embodiments, the data schema 180 can include Secure Shell, Secure Copy, Secure FTP, or other suitable header fields.

FIG. 6B is a schematic diagram illustrating example header fields suitable for the HTTP field 185 in FIG. 6A in accordance with embodiments of the disclosed technology. As shown in FIG. 6B, the header fields can include a content encoding field 187 configured to contain an encoding identification, a content length field 188 configured to store a content or payload length in, for instance, bytes, and a status field 189 configured to contain a numerical value indicating whether the content or payload associated with the HTTP header is valid. In the illustrated example, the content encoding field 187 contains "gzip" as an encoding identifier; the content length field 188 contains "348" indicating that the content or payload is 348 bytes long; and the status field 189 contains a numerical value of "200" indicating that the content or payload is valid. Though particular fields are shown in FIG. 6B as examples, in other embodiments, the HTTP header 185 can also include fields configured to contain content language, content location, content range, and/or other suitable parameters.

FIGS. 7A-7D are flowcharts illustrating processes for accessing a cloud resource using VNET addresses in a cloud computing system in accordance with embodiments of the disclosed technology. Though the processes are described below in light of the cloud computing system 100 of FIGS. 1-4D, in other embodiments, the processes can also be performed in other computing systems with similar or different components.

Figure 7A:
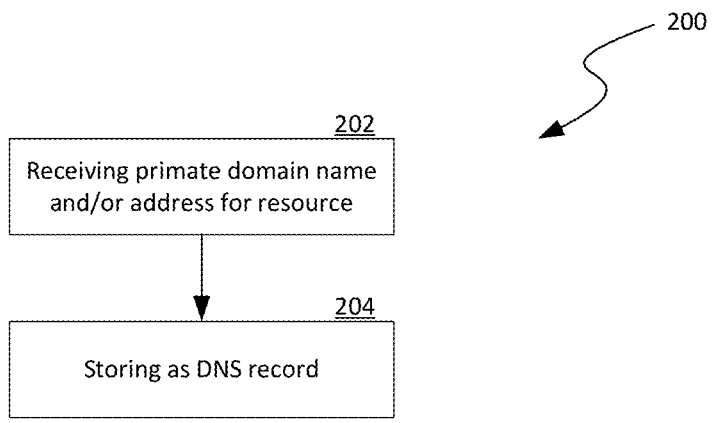
FIGS. 7A-7D are flowcharts illustrating various aspects of processes for accessing a cloud resource using VNET addresses in accordance with embodiments of the disclosed technology.

As shown in FIG. 7A, the process 200 can include receiving a private domain name and/or a VNET address for a cloud resource at stage 202. The cloud resource can include a cloud storage account, SQL database account, or other suitable types of cloud resource. In certain embodiments, only a private domain name is received, and the VNET address can be automatically generated by, for example, a Dynamic Host Configuration Protocol (DHCP) controller. In other embodiments, both the private domain name and the VNET address can be received. As such, the private domain name can have a static VNET address. The process 200 can then include storing the received private domain name and/or VNET address as a DNS record at stage 204. The DNS record can be stored in a DNS server or service for a corresponding virtual network or in a DNS server at an on-premise network.

Figure 7B:
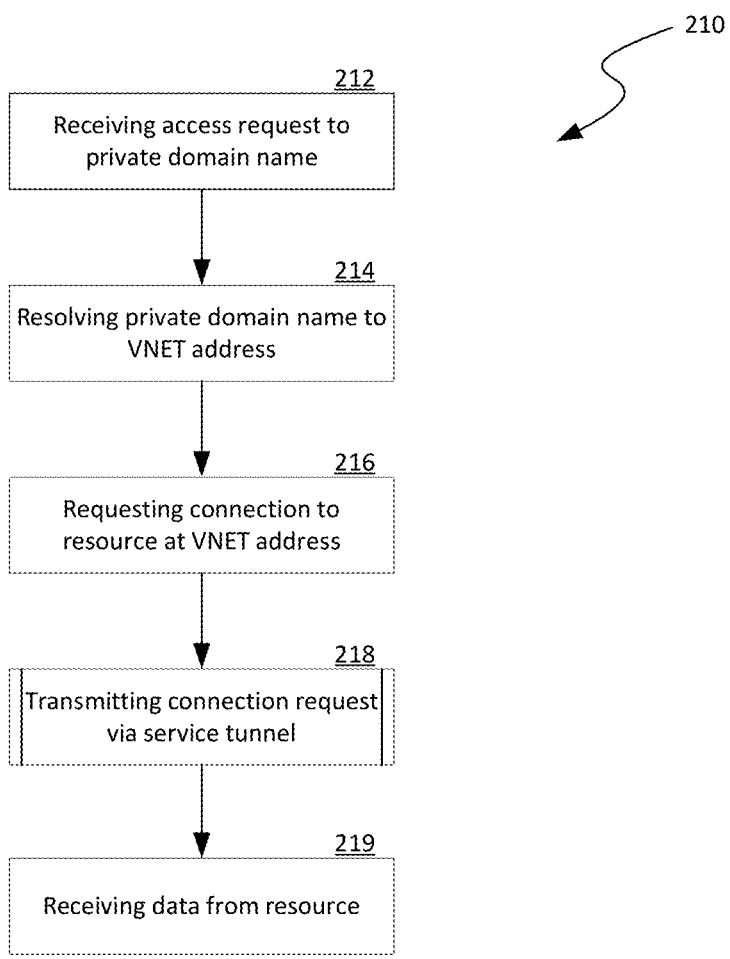

FIG. 7B illustrate an example process 210 for processing a connection request to a cloud resource having a private domain name. As shown in FIG. 7B, the process 210 can include receiving an access request to a cloud resource at a private domain name at stage 212. The process 210 can then include resolving the private domain name to a VNET address at stage 214. The process 210 can then include requesting connection to the cloud resource at the VNET address by, for instance, transmitting one or more connection packets, at stage 216. The connection packets can contain a destination header field having a value corresponding to the VNET address. The process 210 can then include modifying and transmitting the connection packets to the cloud resource via a service tunnel at stage 218. Example operations of modifying and transmitting the connection packets are described in more detail below with reference to FIG. 7C. The process 210 can then include receiving data from the cloud resource at stage 219, once access to the cloud resource is granted.

Figure 7C:
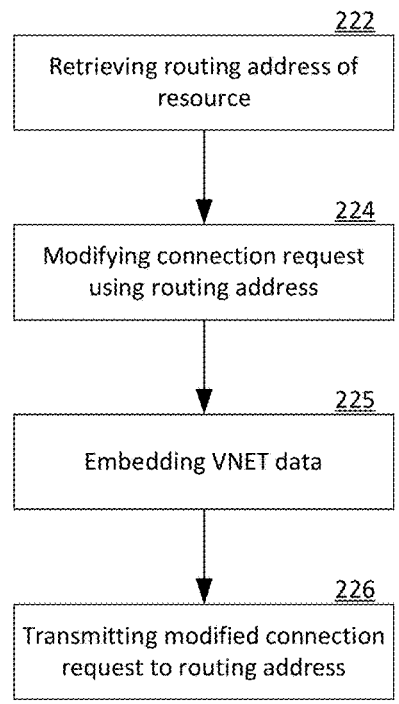

As shown in FIG. 7C, the operations of modifying and transmitting the connection packets can include retrieving a routable network address of the cloud resource at stage 222, by, for instance, querying an SDN controller. The operations can then include modifying the connection packets with the retrieved routable network address at stage 224. The operations can also include embedding VNET data regarding the virtual network, the source of the virtual network, and the VNET address of the destination at stage 225. Examples of embedding such information are described above with reference to FIGS. 3A-3D. The operations can then include transmitting the modified packets to the cloud resource at stage 226.

Figure 7D:
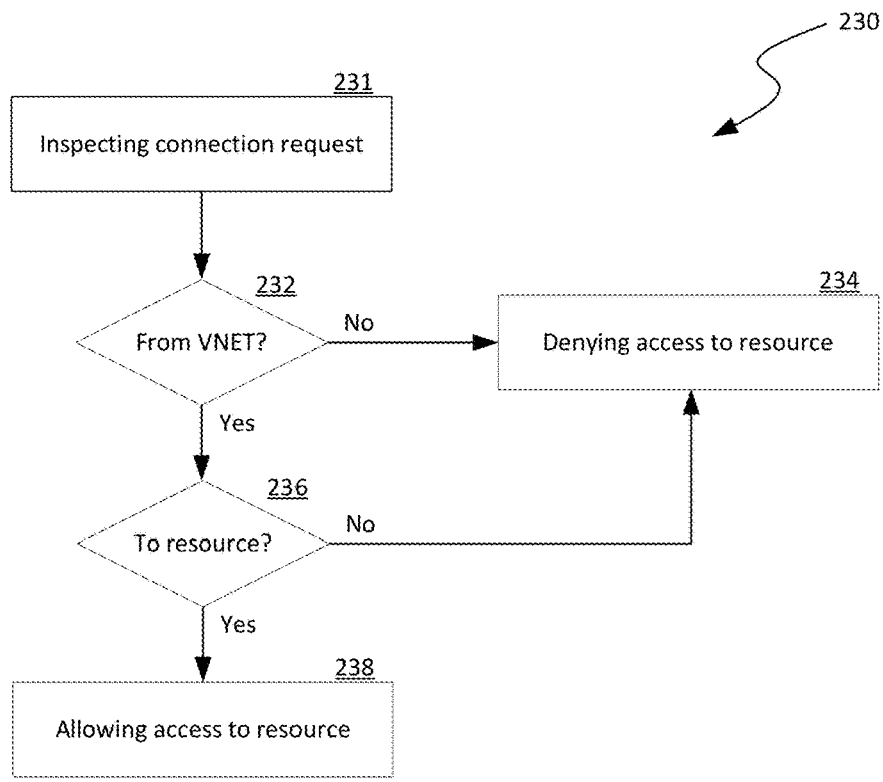

FIG. 7D illustrates a process 230 of access control at a cloud storage using VNET addresses. As shown in FIG. 7D, the process 230 can include inspecting one or more connection packets at stage 231. As described above with reference to FIGS. 3A-3D, inspecting such packets can include extracting VNET data associated with the connection request. The process 230 can then include a decision stage 232 to determine whether the connection request is generated from a virtual network with access rights at stage 232 based on the extracted VNET data. In response to determining that the connection request is not generated from a virtual network with access rights, the process 230 includes denying access to the cloud resource at stage 234. Otherwise, the process 230 can include another decision stage 236 to determine whether the connection request is directed to the particular cloud resource based on, for example, the destination VNET address. In response to determining that the connection request is not directed to the particular cloud resource, the process 230 reverts to denying access to the cloud resource at stage 234. Otherwise, the process 230 can include allowing access to the cloud resource at stage 238.

Figure 8:
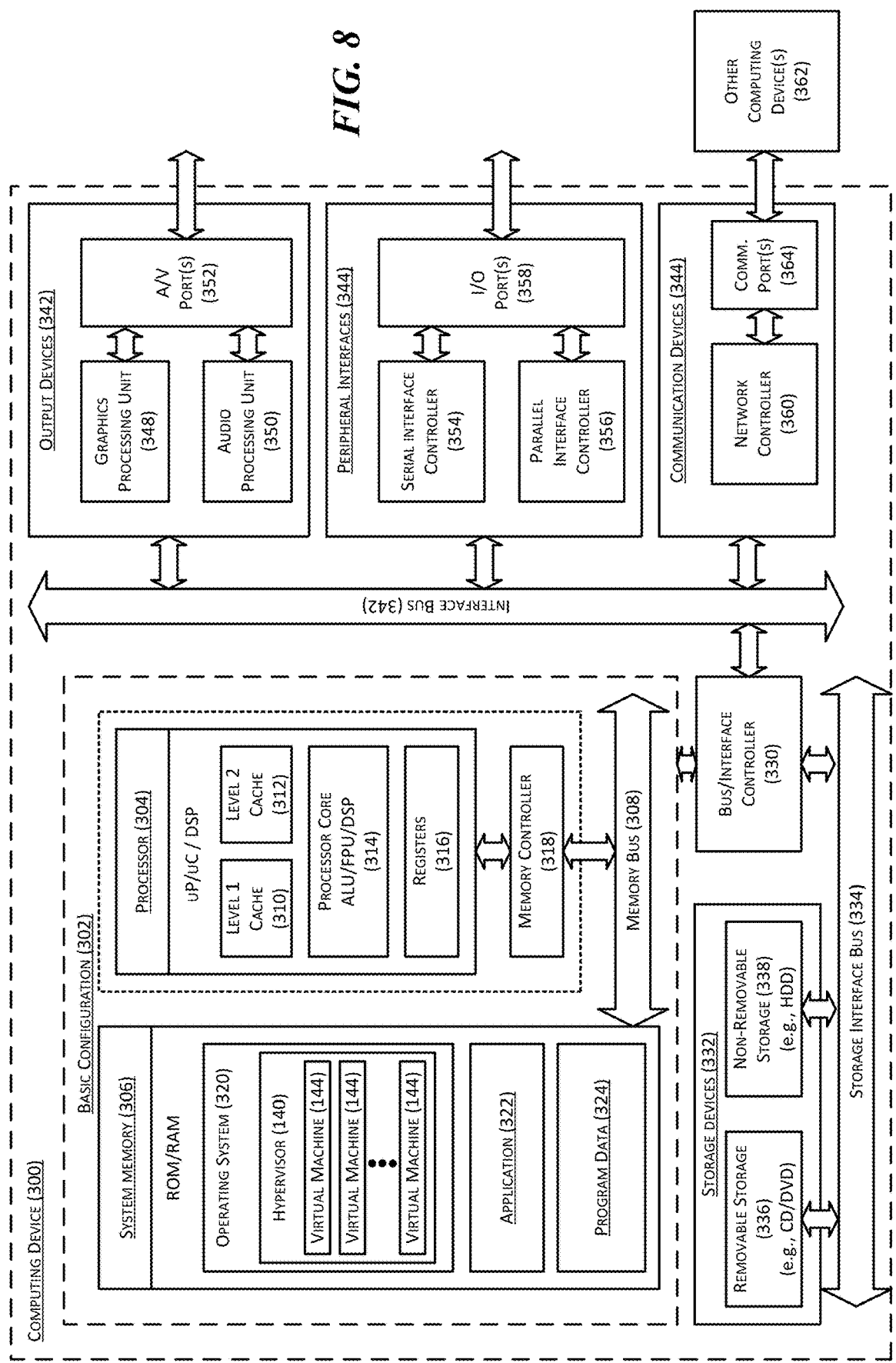
FIG. 8 is a computing device suitable for certain components of the cloud computing system in FIG. 1.

FIG. 8 is a computing device 300 suitable for certain components of the cloud computing system 100 in FIG. 1. For example, the computing device 300 can be suitable for the hosts 106, the client devices 102, or the cloud storage 111 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 11, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for accessing shared cloud resource using virtual network (VNET) addresses in a cloud computing system having a plurality of hosts interconnected by a underlay network, the method comprising:
   intercepting, at a host in the cloud computing system, a connection packet representing a connection request from a source having a VNET source address in a virtual network of a tenant having a VNET ID to a shared cloud resource in the cloud computing system at a VNET destination address assigned to the shared cloud resource by the tenant of the virtual network; and
   in response to intercepting the connection packet destined to the VNET destination address, at the host, encapsulating the connection packet with data representing the VNET ID, the VNET source address, and the VNET destination address of the virtual network from which the connection packet is received;
   converting the VNET destination address of the shared cloud resource to a routable network address to a controller of the shared cloud resource in the underlay network of the cloud computing system; and
   according to the routable network address, forwarding the connection packet to the controller of the shared cloud resource in the cloud computing system along with the encapsulated VNET ID, VNET source address, and the VNET destination address, and enabling transmission of the connection packet to the shared cloud resource at the routable network address of the controller while retaining the data representing the VNET ID of the VNET, the VNET source address of the source, and the VNET destination address of the shared cloud resource for access control at the controller of the shared cloud resource.

2. The method of claim 1 wherein forwarding the encapsulated connection packet includes:
   modifying a destination address field of the connection packet with the determined routable network address; and
   transmitting, the modified connection packet with the routable network address to the cloud resource via the computer network.

3. The method of claim 1 wherein the host includes a firewall associated with the virtual network, and wherein the method further includes:
   in response to intercepting the connection packet,
      determining whether the connection request is directed to a public network address; and
      in response to determining that the connection request is directed to a public network address, denying the access request according to a policy pre-configured in the firewall.

4. The method of claim 1 wherein the host includes a firewall associated with the virtual network, and wherein the method further includes:
in response to intercepting the connection packet,
determining whether the connection request is directed to a public network address; and
in response to determining that the connection request is directed to a public network address,
determining whether the VNET destination address is allowed access in the firewall; and
in response to determining that the VNET destination address is not allowed access in the firewall, denying the access request according to another policy pre-configured in the firewall.

5. The method of claim 1 wherein the host includes a firewall associated with the virtual network, and wherein the method further includes:
in response to intercepting the connection packet,
determining whether the connection request is directed to a public network address; and
in response to determining that the connection request is directed to a public network address,
determining whether the VNET destination address is allowed access in the firewall; and
in response to determining that the VNET destination address is allowed access in the firewall, performing the encapsulating, determining, and forwarding operations.

6. The method of claim 1 wherein the host includes a firewall associated with the virtual network, and wherein the method further includes:
determining whether the connection request is received from a public network address; and
in response to determining that the connection request is received from a public network address, denying the access request according to a policy pre-configured in the firewall.

7. The method of claim 1 wherein determining the routable network address includes querying a Software Defined Network (SDN) controller to determine a network address of the cloud resource in an underlay network of the cloud computing system.

8. The method of claim 1 wherein encapsulating the connection packet includes encoding the VNET ID, the VNET source address, or the VNET destination address in an Internet Protocol version 6 (IPv6) address format and appending the encoded IPv6 address to the connection packet.

9. The method of claim 1, further comprising:
upon receiving the connection packet, at the cloud resource,
inspecting the encapsulated connection packet to extract the VNET ID, the VNET source address, or the VNET destination address; and
determining whether to grant access to the shared cloud resource according to one or more of the extracted VNET ID, VNET source address, or VNET destination address.

10. A computing device connectable to other computing devices in a cloud computing system by a underlay network, comprising:
a processor;
a network interface card ("NIC"); and
a memory containing instructions executable by the processor to cause the computing device to:
receive a connection request from a source having a virtual network (VNET) source address in a virtual network of a tenant having a VNET ID to a shared cloud resource having a private domain name corresponding to a VNET destination address assigned to the shared cloud resource by the tenant of the virtual network in the virtual network in the cloud computing system; and
in response to receiving the connection request, resolve the private domain name to the VNET destination address assigned by the tenant of the VNET;
convert the resolved VNET destination address of the shared cloud resource to a routable network address to a controller of the shared cloud resource in the underlay network of the cloud computing system;
encapsulate a connection packet representing the connection request with data representing the VNET ID, VNET source address, and the resolved VNET destination address of the virtual network; and
transmit, via the NIC, the encapsulated connection packet to the controller of the shared cloud resource in the computer network according to the routable network address along with the encapsulated VNET ID, VNET source address, and the VNET destination address, and enabling transmission of the connection packet to the controller of the shared cloud resource while retaining the data representing the VNET ID, the VNET source address, and the VNET destination address for access control at the controller of the shared cloud resource.

11. The computing device of claim 10 wherein the memory contains additional instructions executable by the processor to cause the computing device to:
determine a routable network address to the shared cloud resource in the computer network of the cloud computing system; and
modify a destination address field of the connection packet with the determined routable network address before transmitting the encapsulated connection packet to the shared cloud resource in the computer network.

12. The computing device of claim 10 wherein the memory contains additional instructions executable by the processor to cause the computing device to:
encapsulate the connection packet with one or more of a VNET ID of the virtual network, a VNET source address from which the connection request is received, or a VNET subnet to which the VNET destination address belongs.

13. The computing device of claim 10 wherein the host includes a firewall associated with the virtual network, and wherein the memory contains additional instructions executable by the processor to cause the computing device to:
determine whether the connection request to the shared cloud resource is received from a public network address; and
in response to determining that the connection request is received from a public network address, denying the access request according to a policy pre-configured in the firewall.

14. The computing device of claim 10 wherein the host includes a firewall associated with the virtual network, and wherein the memory contains additional instructions executable by the processor to cause the computing device to:
determine whether the VNET destination address is allowed access through the firewall; and
in response to determining that the VNET destination address is not allowed access through the firewall, denying the access request according to another policy pre-configured in the firewall.

15. The computing device of claim 10 wherein the host includes a firewall associated with the virtual network, and wherein the memory contains additional instructions executable by the processor to cause the computing device to:

determine whether the VNET destination address is allowed access through the firewall; and in response to determining that the VNET destination address is allowed access through the firewall, perform the encapsulating and transmitting operations.

16. The computing device of claim 10 wherein to encapsulate the connection packet includes to encode the VNET destination address in an Internet Protocol version 6 (IPv6) address format and appending the encoded IPv6 address to the connection packet.

17. A method for performing access control of a shared cloud resource using virtual network (VNET) addresses in a cloud computing system having a plurality of hosts interconnected by a underlay network, the method comprising:

receiving, at a network address in the underlay network of a controller configured to manage the shared cloud resource, a connection packet representing a connection request to the shared cloud resource in the cloud computing system, the connection packet encapsulating a VNET ID of a virtual network, a VNET source address corresponding to a source in the virtual network requesting access to the shared cloud resource, and a VNET destination address assigned to the shared cloud resource by a tenant of the virtual network; and in response to receiving the connection packet, at the controller, inspecting the received connection packet to extract one or more of the VNET ID, the VNET source address, or the VNET destination address of the virtual network from which the connection packet is originated; and determining whether to grant access to the shared cloud resource in response to the received connection request according to a value of one or more of the extracted VNET ID, VNET source address, or VNET destination address, and controlling access to the shared cloud resource based on a pre-configured access control list without the shared network resource having a corresponding network address in the underlay network.

18. The method of claim 17 wherein determining whether to grant access to the shared cloud resource includes:

determining whether the virtual network has access rights to the shared cloud resource according to the value of the extracted VNET ID; and in response to determining that the virtual network has no access rights to the shared cloud resource, denying the connection request to the shared cloud resource.

19. The method of claim 17 wherein determining whether to grant access to the shared cloud resource includes:

determining whether the virtual network has access rights to the shared cloud resource according to the value of the extracted VNET ID; and in response to determining that the virtual network has access rights to the shared cloud resource, determining whether a virtual machine or an application corresponding to the value of the VNET source address has access rights to the shared cloud resource; and in response to determining that the virtual machine or application corresponding to the value of the VNET source address has no access rights to the shared cloud resource, denying the connection request to the shared cloud resource.

20. The method of claim 17 wherein determining whether to grant access to the shared cloud resource includes:

determining whether the virtual network has access rights to the shared cloud resource according to the value of the extracted VNET ID; and in response to determining that the virtual network has access rights to the shared cloud resource, determining whether a virtual machine or an application corresponding to the value of the VNET source address has access rights to the shared cloud resource; and in response to determining that the virtual machine or application corresponding to the value of the VNET source address has access rights to the shared cloud resource, determining whether the connection request is directed to an account at the shared cloud resource corresponding to the VNET destination address; and in response to determining that the connection request is directed to an account at the shared cloud resource corresponding to the VNET destination address, granting the connection request to allow access to the account at the shared cloud resource.

* * * * *